(12) United States Patent
Burgoon et al.

(10) Patent No.: US 7,449,808 B2
(45) Date of Patent: Nov. 11, 2008

(54) STRANDED BAR TO SOLIDIFIED BAR BRAZE METHOD AND SERIES LOOP CONNECTION

(75) Inventors: David R. Burgoon, Sussex, NJ (US); Craig A. Wroblewski, Schenectady, NY (US); J. Thad Henley, Saratoga Springs, NY (US); Waheed Tony Mall, Waterford, NY (US); Jerry H. Randall, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 11/257,136

(22) Filed: Oct. 25, 2005

(65) Prior Publication Data

US 2007/0090715 A1     Apr. 26, 2007

(51) Int. Cl.
*H02K 17/00* (2006.01)

(52) U.S. Cl. ...................................... 310/201
(58) Field of Classification Search ................. 310/260, 310/179, 201
See application file for complete search history.

(56) References Cited

U.S. PATENT DOCUMENTS 3,192,423 A * 6/1965 Pearson ....................... 310/201
4,274,021 A * 6/1981 Kamiya et al. ................ 310/54
5,270,598 A    12/1993 Holly
5,283,941 A *  2/1994 Meyer et al. .................. 29/598
5,796,189 A *  8/1998 Manning et al. .............. 310/54
6,969,932 B2* 11/2005 Kim et al. ..................... 310/59
7,073,247 B2*  7/2006 Rowe et al. ................... 29/596
7,202,579 B2*  4/2007 Kim et al. ..................... 310/59
2002/0047454 A1  4/2002 Joho
2004/0216301 A1 11/2004 Rowe et al.

FOREIGN PATENT DOCUMENTS

GB         2019663       4/1979

OTHER PUBLICATIONS

Great Britain Search Report dated Feb. 14, 2007 issued in counterpart GB Application No. GB0621008.2

* cited by examiner

*Primary Examiner*—Nguyen N Hanh
(74) *Attorney, Agent, or Firm*—Nixon & Vanderhye PC

(57) ABSTRACT

A stator bar series loop connection is provided that is comprised of a solidified stator bar and a stranded stator bar disposed in a stator slot so that one of the bars is disposed as a top bar and the other of the bars is disposed as a bottom bar in the slot. A first side plate is brazed adjacent a first end thereof to a first side of an end of the solidified bar and adjacent a second end thereof to a first side of the stranded bar. Further, a second side plate is brazed adjacent a first end thereof to a second side of the end of the solidified bar and adjacent a second end thereof to a second side of the stranded bar. Accordingly, the stranded bar is series connected to the solidified bar.

9 Claims, 6 Drawing Sheets

STRANDED BAR TO SOLIDIFIED BAR BRAZE METHOD AND SERIES LOOP CONNECTION

BACKGROUND OF THE INVENTION

One technique, called strand-to-strand brazing is a procedure for brazing series loops of a strand-to-strand configuration. After stator bar assembly and during stator wind, the top and bottom strands are cut to size, bent into position and brazed layer by layer. Examples of this technique are illustrated in FIGS. 1-5.

One technique, called strand-to-strand brazing is a procedure for brazing series loops of a strand-to-stand configuration. After stator bar assembly and during stator wind, the top and bottom strands are cut to size, bent into position and brazed layer by layer. Examples of this technique are illustrated in FIGS. 1-5.

Referring to FIGS. 1-3, two inner strands 10 are bent down from the top bar into position and cutoff with special cutters. Two inner strands 12 from the bottom bar are then bent into position to overlap the top strands 10 and cut. The minimum overlap of brazed strands is about three times the thickness of the strand, e.g., at least about 0.37 inches. The overlap is always made equal to or greater than the width of the copper being brazed. The brazes are made over an arc of approximately 90 degrees (FIG. 1) although this angle may be limited to accessible space for braze equipment. The gap between consecutive sets of brazes is nominal, e.g., 0.090 inches to 0.160 inches. When brazing a joint, it is separated from previous joints by a mica strip 14. As a consequence, radial separation between adjacent joints is, e.g., a maximum of 0.03 inches including the mica separator thickness. Before brazing, a braze alloy ribbon 16 is centered in the overlap area to be brazed.

For joints of one strand over one strand, the braze alloy ribbon is inserted as illustrated in FIGS. 2 and 3. Brazes may be 1, 2, or 4 strands wide. For joints of 2 strands over 2 strands, as illustrated in FIGS. 4 and 5, braze alloy 16 ribbon is inserted to cover all areas to be brazed. The eight strands are brazed in one operation, two wide by four deep. A brazing fixture or clamps are placed such that the overlapping strands are held tightly and in alignment, and exerting enough pressure to cause the pre-placed braze alloy 16 to flow and fill the joint as it melts when heat is applied. Heat is applied such that the joint is heated rapidly, but evenly to a brazing temperature of 1292° F. to 1364° F. (700° C. to 740° C.). The assembly reaches the proper temperature when the strands are dull cherry red in color and the pre-placed braze alloy flows. Face fed braze alloy may be added as needed to ensure that the joint is effectively filled, but not so much as to form drips. The assembly is then allowed to cool and solidify, after which pressure is released and it is visually inspected.

As is apparent, strand-to-strand brazing provides great flexibility because the bars can be cut to size as needed during winding, but assembly is time consuming and thus costly.

Another braze technique for series connections is referred to as the single shot braze, which is used for making series loops in a generator wound with solidified stranded stator bars. With this technique, a first braze process is carried out during stator bar manufacturing to solidify the stranded bar package ends. A second braze process is then performed after stator bar assembly (during stator wind) to complete top to bottom bar series loop connections. Since the method uses only one braze per series loop in assembly, it has been coined the one or single shot braze method. For brazing solidified strands to solid phase connections (not shown), a solid connection strap is used to sandwich the strands, using a copper plate on one side of the solidified strands and the connection strap on the other. Bar to bar (series) loops, as schematically illustrated in FIG. 6 have a copper plate 36 on each side of the solidified strands 32, 34 to form a sandwich and are brazed as one unit. Thus, two plates 36 are assembled between a top and bottom bar 32, 34 as illustrated, and clamps (not shown) are used to hold the plates in place. The braze is performed by heating the area around the top, radially inner, bar 32 first until braze temperature is reached (dull red color—1350° F.) and adding braze alloy around all four sides of the joint for each plate. Then the installer switches to the other ends of the plates at the bottom bar 34 (the stator bar seated in the bottom of the slot) and completes that part of the braze in the same manner.

As illustrated in FIG. 7, for brazing non-solidified stator bar 20 to solid phase strap connection, the strand package 20 is received between the phase connection strap 22 and backer plate 24. Braze alloy (sheets and stick) 26 between the stranded tiers, between the stranded tiers and the strap and plate, respectively, and between the strap 22 and plate 24 solidifies the assembly axially and radially over the entire joint.

BRIEF DESCRIPTION OF THE INVENTION

As noted above, strand-to-strand brazing offers flexibility over single shot brazing but at an increased cost. In an example embodiment of the invention, stranded bar to solidified bar brazing is proposed to realize the cost savings associated with connecting solidified strands and the flexibility offered by non-solidified stator bars.

Thus, the invention may be embodied in a method of forming a stator bar series loop connection comprising: providing a solidified stator bar and a stranded stator bar; brazing a first side plate adjacent a first end thereof to a first side of an end of said solidified bar; brazing a second side plate adjacent a first end thereof to a second side of said end of said solidified bar; installing said bars into a stator slot so that one of said bars is disposed as a top bar and the other of said bars is disposed as a bottom bar in said slot; disposing the strands of said stranded bar between second ends of said side plates; disposing braze alloy between said side plates and said strands of said stranded bar adjacent second ends of said side plates; and brazing said side plates to said stranded bar, thereby to series connect said stranded bar to said solidified bar.

The invention may also be embodied in a stator bar series loop connection comprising: a solidified stator bar and a stranded stator bar disposed in a stator slot so that one of said bars is disposed as a top bar and the other of said bars is disposed as a bottom bar in said slot; a first side plate brazed adjacent a first end thereof to a first side of an end of said solidified bar and adjacent a second end thereof to a first side of said stranded bar; a second side plate brazed adjacent a first end thereof to a second side of said end of said solidified bar and adjacent a second end thereof to a second side of said stranded bar; whereby said stranded bar is series connected to said solidified bar.

DETAILED DESCRIPTION OF THE INVENTION

Brazing strand to strand stator bars offers flexibility over single shot brazing but increases production costs. To reduce the cost of brazing stator bars while preserving flexibility, a stranded bar to solidified bar braze is proposed so that cost savings is realized over strand-to-strand brazing while flexibility is realized over single shot brazing. In this regard, using a stranded bar allows the installer to compensate for misalignment between the top and bottom bars because of the flexibility of the strands.

Figure 1:
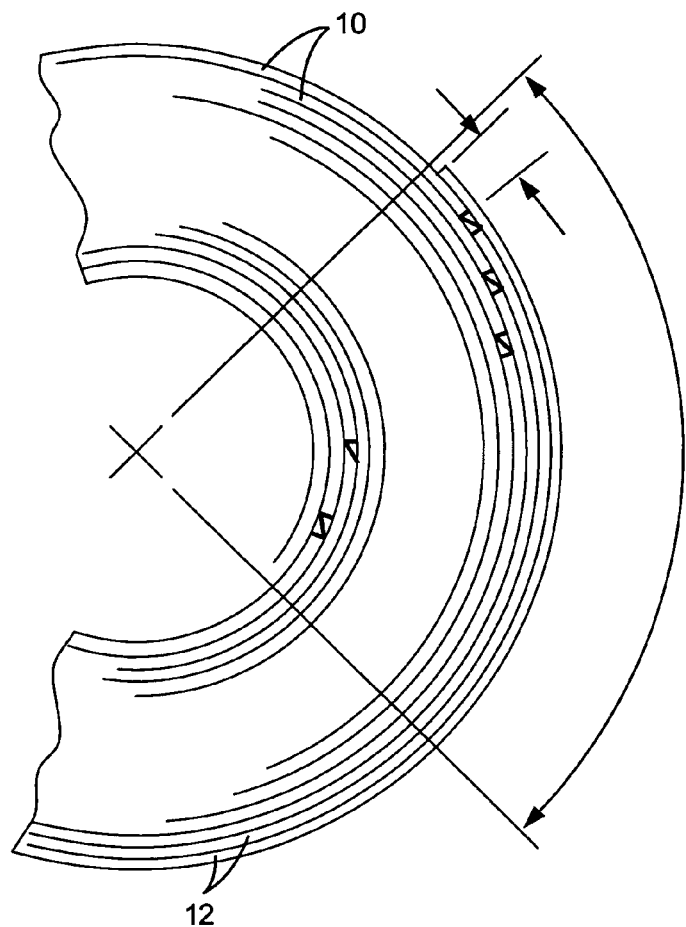
FIG. 1 is a schematic elevational view of a strand-to-strand series loop illustrating stand-to-strand brazing.
Figure 2:
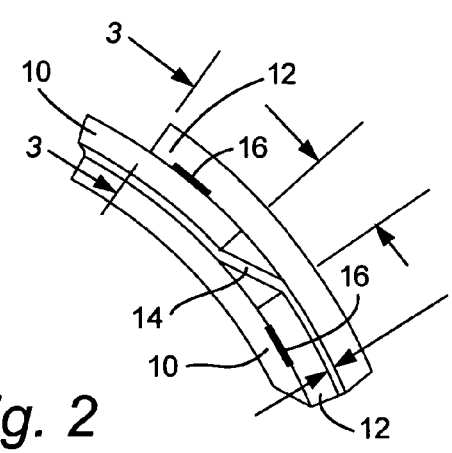
FIG. 2 is an enlarged view of a portion of FIG. 1.
Figure 3:
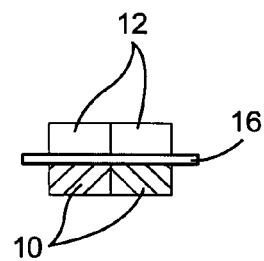
FIG. 3 is a view taken along line 3-3 of FIG. 2.
Figure 4:
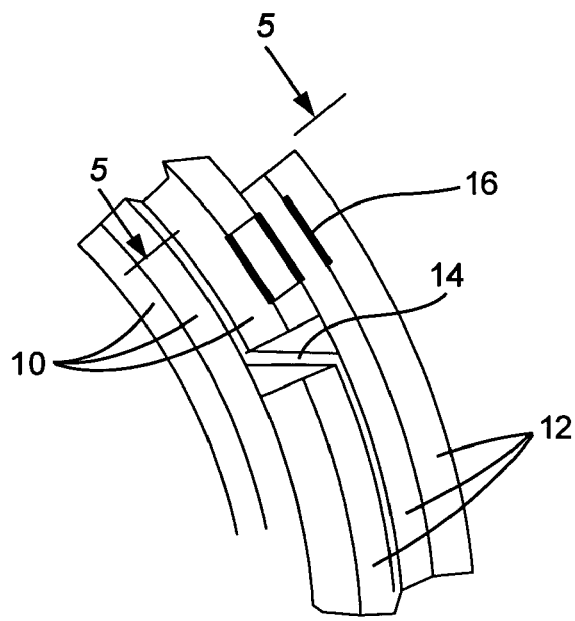
FIG. 4 is a view similar to FIG. 2 illustrating a two strand-to-two strand braze.
Figure 5:
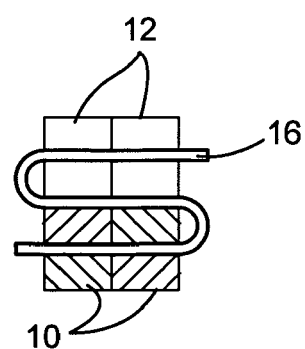
FIG. 5 is a view taken along line 5-5 of FIG. 4.
Figure 6:
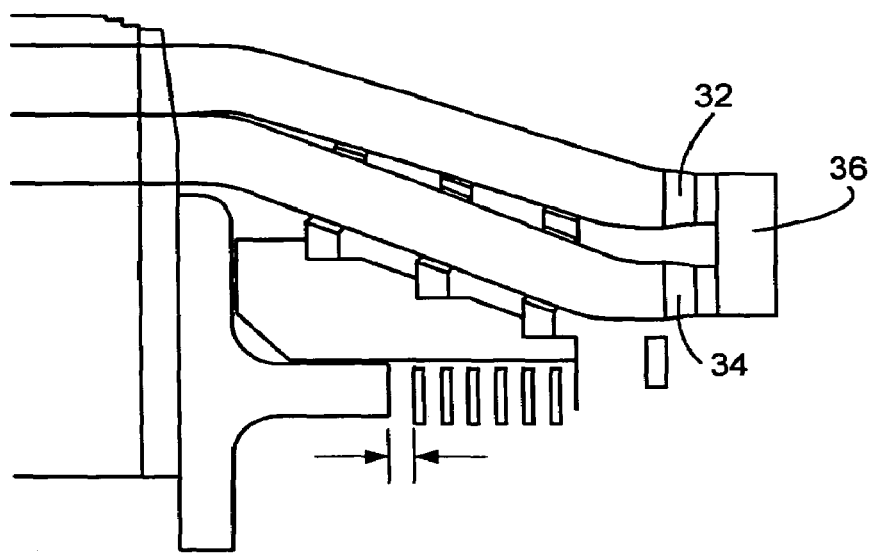
FIG. 6 is a schematic elevational view of a single shot braze series connection.
Figure 8:
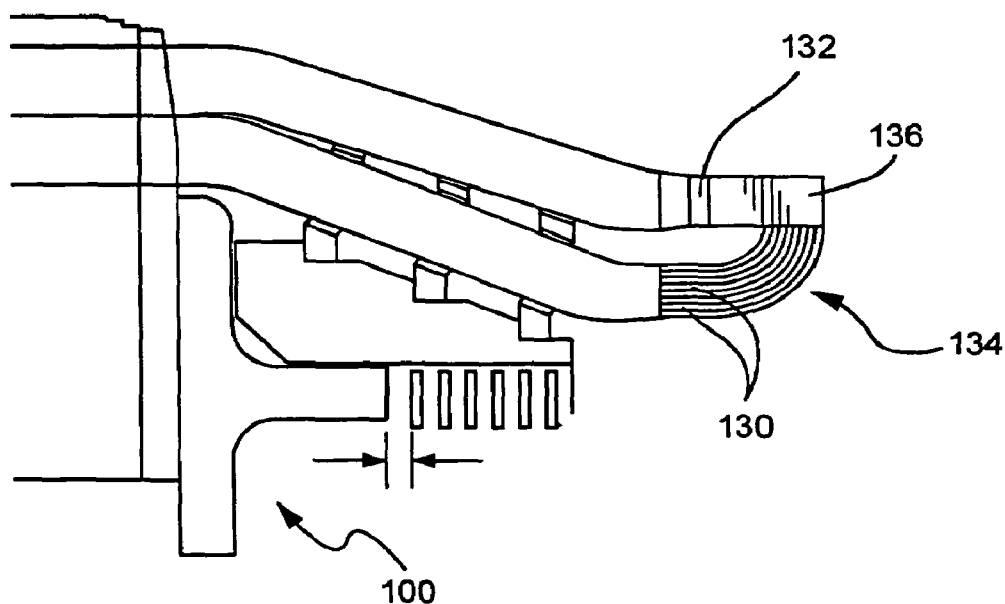
FIG. 8 is a schematic elevational view of a stranded bar to solidified bar braze as an example embodiment of the invention.
Figure 7:
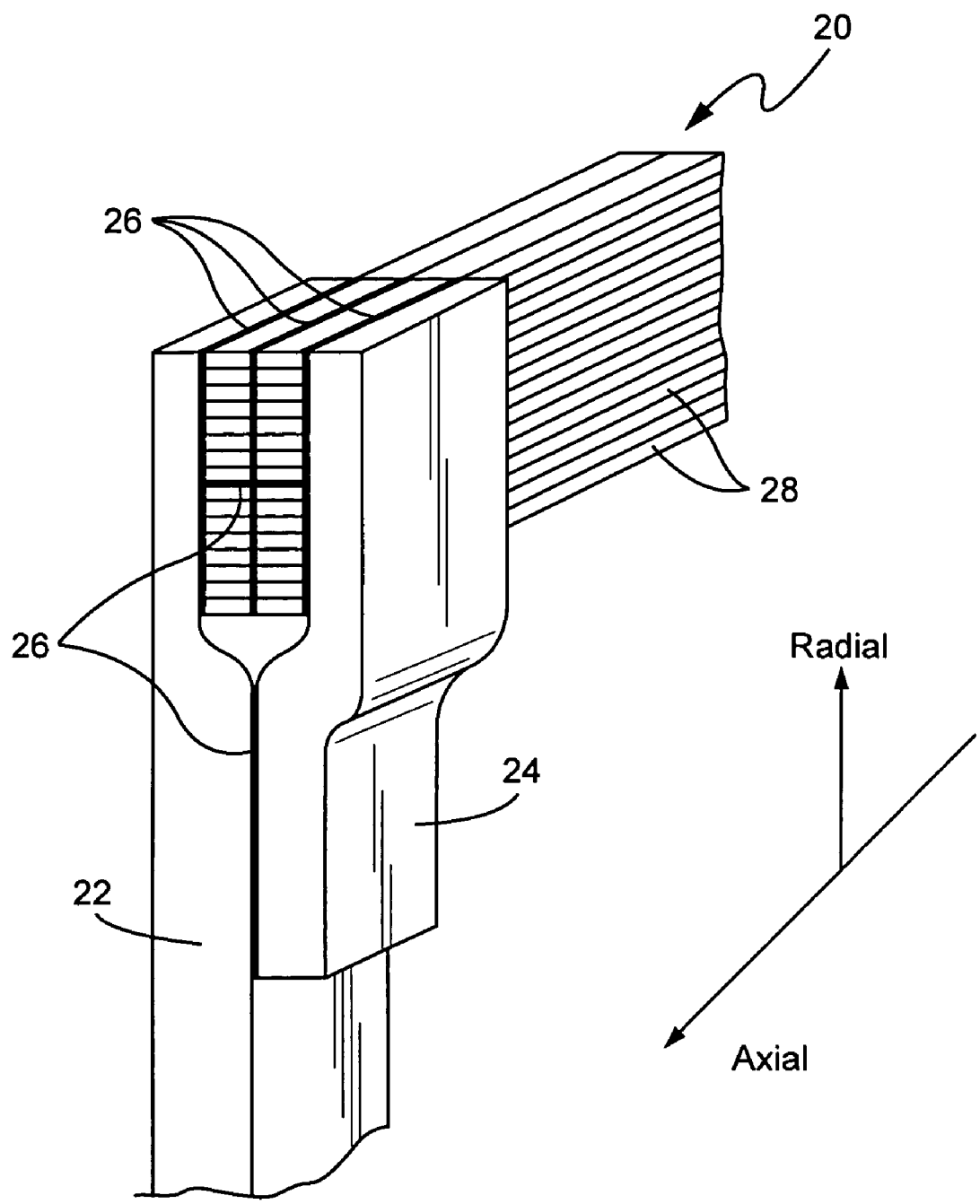
FIG. 7 is a perspective view of a non-solidified stator bar to connection strap braze.
Figure 9:
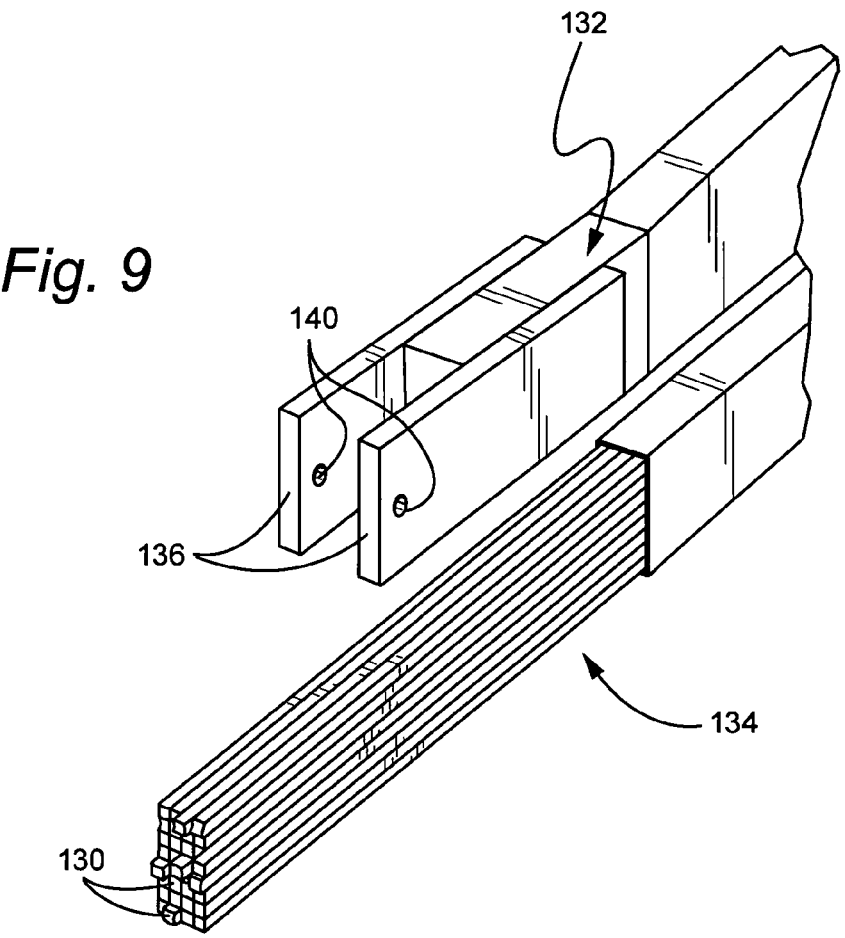
FIG. 9 is a schematic perspective view of a solidified bar and stranded bar after being installed in into a stator slot, in an example embodiment of the invention.
Figure 10:
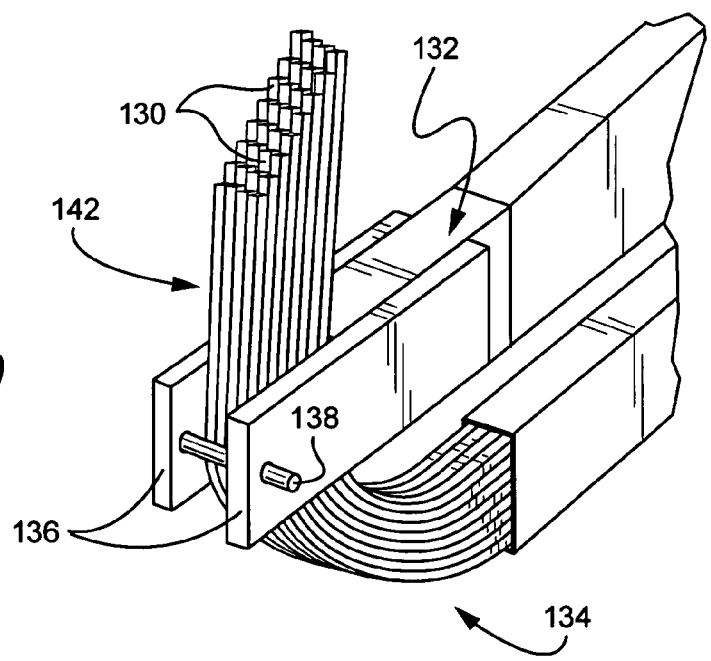
FIG. 10 is a schematic perspective view showing the stranded leads of the stranded bar bent up and in between the strapping plates.
Figure 11:
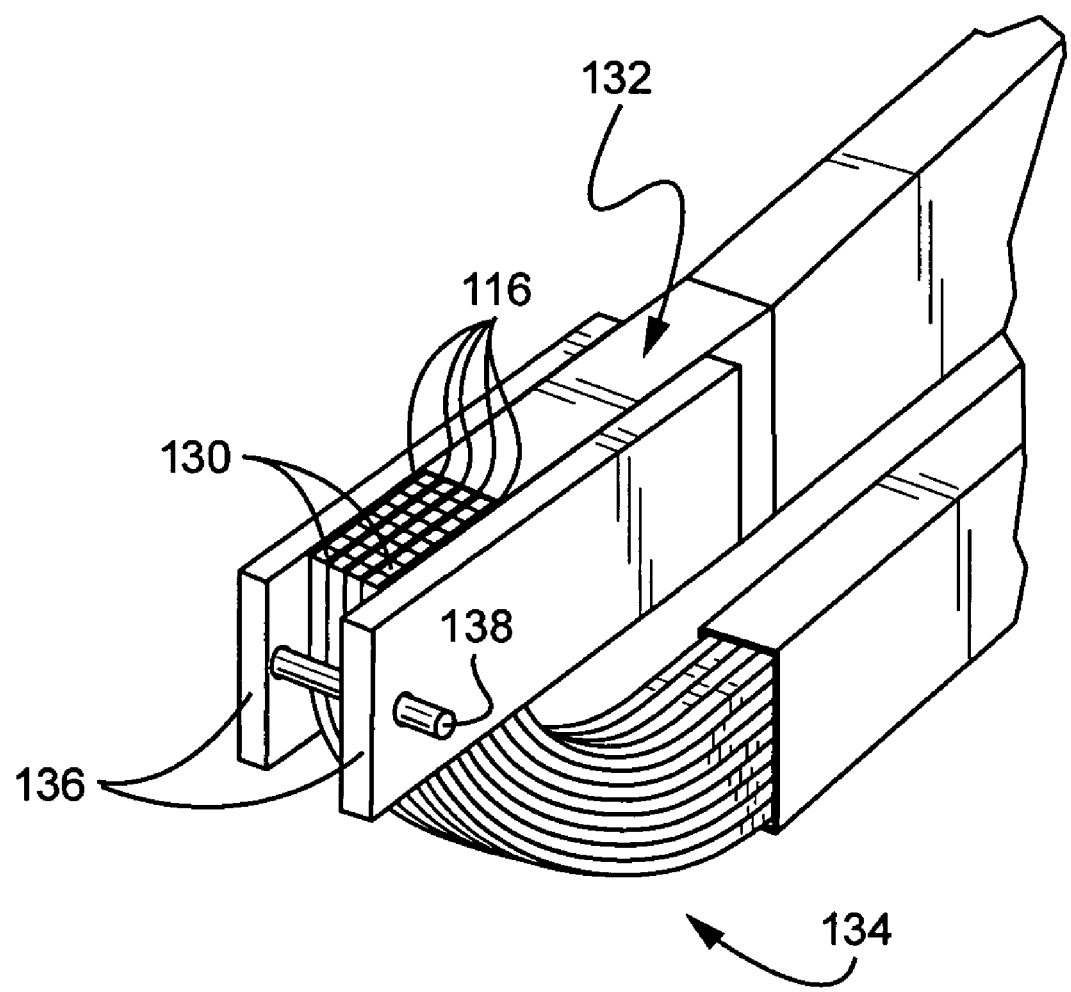
FIG. 11 is a schematic perspective view showing the assembly of FIG. 10 after excess stranded leads are cut flush with the strapping plates.

In an example embodiment of the invention, top stator bars 132 are solidified in the factory and have two side plates 136, e.g., copper strapping plates, brazed onto them. The bottom bars 134, however, remain stranded. Referring to FIGS. 9-11, when the bars 132, 134 are received in the field, the bottom and top bars are installed into the stator 100. The operator then feeds the bottom strands 130 into between the side plates 136 extending from the top solidified bars 132. In the illustrated example, a pin or bolt 138 is fed through aligned holes 140 in the plates 136 to retain the bent strands in place. The operator then places alloy 116 in between the strand columns and between the strand columns and the adjacent plates and the excess 142 of the stranded leads 130 are cut flush with the strapping plates 136.

The thus formed joint (FIG. 11) is clamped and torch brazed, while feeding braze alloy if and as needed, so that the strands of the bottom bar (in this example embodiment) are secured via the plates to the top bar (in this example embodiment) to complete the series connection. Either a single tip torch or a two-tip torch may be used. The size of the torch and number of tips will depend on the amount of heat required to bring the copper components up to a braze temperature. A Harris model 50-10 series torch with two rosebud tips is used in an example embodiment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a stator bar series loop connection comprising:
 a) providing a solidified stator bar and a stranded stator bar;
 b) brazing a first side plate adjacent a first end thereof to a first side of an end of said solidified bar;
 c) brazing a second side plate adjacent a first end thereof to a second side of said end of said solidified bar;
 d) installing said bars into a stator slot so that one of said bars is disposed as a top bar and the other of said bars is disposed as a bottom bar in said slot;
 e) disposing the strands of said stranded bar between second ends of said side plates;
 f) disposing braze alloy between said side plates and said strands of said stranded bar adjacent second ends of said side plates; and
 g) brazing said side plates to said stranded bar, thereby to series connect said stranded bar to said solidified bar.

2. A method as in claim 1, further comprising, after said step f), cutting off ends of said strands of said stranded bar that extend beyond the side plates.

3. A method as in claim 1, wherein in step d), said solidified bar is disposed as a radially inner, top bar in said stator slot.

4. A method as in claim 1, wherein said brazing steps b) and c) are performed by heating said side plates and said respective end of said solidified bar.

5. A method as in claim 4, wherein heating is with a torch.

6. A method as in claim 5, wherein the torch has plural tips.

7. A method as in claim 1, wherein said brazing steps b) and c) are performed simultaneously.

8. A method as in claim 1, wherein said brazing steps b) and c) are performed before said installing step d).

9. A method as in claim 1, wherein said solidified bar is solidified in a factory before being delivered to the field so that the end of the solidified bar is integrated as a solid end having first and second side faces and an end face.

\* \* \* \* \*

UNITED STATES PATENT AND TRADEMARK OFFICE
CERTIFICATE OF CORRECTION

| | | |
|---|---|---|
| PATENT NO. | : 7,449,808 B2 | Page 1 of 1 |
| APPLICATION NO. | : 11/257136 | |
| DATED | : November 11, 2008 | |
| INVENTOR(S) | : Burgoon et al. | |

It is certified that error appears in the above-identified patent and that said Letters Patent is hereby corrected as shown below:

Please delete the entire first paragraph of the patent column 1 lines 7-12 and insert --After stator bar assembly (during stator wind) a top to bottom bar series loop connection must be achieved.--

At column 2 line 65 change the word "stand" to the word --strand--

Signed and Sealed this

Fourteenth Day of July, 2009

JOHN DOLL
*Acting Director of the United States Patent and Trademark Office*